United States Patent [19]
Summerfield

[11] Patent Number: 6,121,823
[45] Date of Patent: Sep. 19, 2000

[54] ELECTRICAL CIRCUIT FOR SENSORS REQUIRING A VARIETY OF BIAS VOLTAGES

[75] Inventor: Stephen D. Summerfield, Phoenixville, Pa.

[73] Assignee: Analytical Technology, Inc., Oaks, Pa.

[21] Appl. No.: 09/271,311

[22] Filed: Mar. 17, 1999

[51] Int. Cl.[7] .......................... G01N 22/04; G08C 19/04
[52] U.S. Cl. .............................. 327/538; 327/52; 327/53; 327/54; 327/530; 327/535; 326/37; 326/39; 330/96; 330/127; 330/129
[58] Field of Search ................................ 327/52, 53, 54, 327/530, 535, 538; 326/37, 39; 330/96, 127, 129

[56] References Cited

U.S. PATENT DOCUMENTS

| | | | |
|---|---|---|---|
| 4,702,816 | 10/1987 | Hashimoto et al. | 204/406 |
| 4,918,995 | 4/1990 | Pearman | 73/861.02 |
| 4,931,674 | 6/1990 | Kub et al. | 307/529 |
| 5,191,327 | 3/1993 | Talmadge et al. | 340/870.38 |
| 5,563,578 | 10/1996 | Isenstein | 340/521 |
| 5,574,678 | 11/1996 | Gorecki | 364/807 |
| 5,841,316 | 11/1998 | Shau | 327/560 |
| 5,939,888 | 8/1999 | Nelson | 324/640 |

OTHER PUBLICATIONS

Advanced Linear Devices, Inc., "Electrically Programmable Analog Device Applications", Application Note AN1108, pp. 1–16 (1997).

*Primary Examiner*—Viet Q. Nguyen
*Attorney, Agent, or Firm*—Woodcock Washburn Kurtz Mackiewicz & Norris LLP

[57] ABSTRACT

An electrical circuit provides a variety of stable and reliable bias voltages to accommodate the bias requirements of various sensor types. The electrical circuit comprises a programmable analog circuit capable of maintaining a plurality of programmable threshold voltages and producing a plurality of intermediary voltages. Such voltages act as an input to a differential amplifier that outputs a bias voltage within a range consistent with said programmable threshold voltages. The bias voltage is further conditioned by a conditioning amplifier that further stabilizes the bias voltage to an attached sensor.

25 Claims, 3 Drawing Sheets

ELECTRICAL CIRCUIT FOR SENSORS REQUIRING A VARIETY OF BIAS VOLTAGES

FIELD OF THE INVENTION

This invention relates generally to the biasing of sensors, and more particularly to an electrical circuit capable of providing a range of bias voltage required by various types of sensors.

BACKGROUND OF THE INVENTION

Generally, sensors are used in the gathering of information for monitoring and controlling systems. Information gathered by sensors is subsequently manipulated by information processing systems in such a way that it becomes accessible to humans or to control the information state directly. In such systems, the sensor plays a central role as it creates input data that is subsequently processed. Sensors take on many shapes and forms having varied and unique operating requirements. For example, depending on the sensor and application, the sensor may require a bias voltage to operate. The bias voltage may be used either to stimulate the sensor to perform its task (e.g., stimulating a transducer) or as a reference voltage used to determine a change in the sensor's environment.

In the specific case of bias voltage as employed with electrochemical gas sensors, however, the purpose is to establish the operating characteristics of the electrochemical cell. In other words the sensitivity, stability, specificity, life, noise-level, etc. to the target gas are determined in-part by the bias voltage. Thus, the bias voltage is one of the design parameters considered in the development of a gas detecting electrochemical cell. For example, for a cell with a specific chemistry, the bias voltage may determine to which, of a variety of gases, the cell will be most sensitive.

As an example, when used in gas detection applications, most electrochemical sensors require an externally generated bias voltage to be applied between sensor electrodes. Electrochemical gas sensors can indicate the presence of gas by either a change of potential across the sensor's electrodes or by causing a current to flow through an external circuit. Depending on the sensor type and application, the "bias" voltage may be zero, positive, or negative. The stability of the bias voltage is important, however, because a fluctuation of the voltage can cause the sensor to respond as though it had detected gas. Also, errors in the bias voltage value can change the sensor's detection characteristics as described above.

Manufacturers of information detection systems have previously utilized various circuit techniques to produce sensor bias voltages. For example such techniques have included the selection of resistors having discrete resistance values or adjusting potentiometers to desired resistance levels that are used in voltage divider networks to produce the required bias voltage. These practices, however, are labor-intensive and difficult to automate. Additionally, once implemented, such bias circuits are specific to the bias requirements of a particular sensor. In an effort to accommodate the bias needs of multiple sensors, resistor ladder circuits and digital to analog converters are utilized but are cumbersome, complex and expensive to implement.

Thus, there is a need for a sensor bias circuit that utilizes simple and inexpensive elements, provides a stable bias, and can be automatically programmed to accommodate various sensor bias requirements. The present invention provides such a bias circuit.

SUMMARY OF THE INVENTION

The present invention is directed towards a circuit for providing various bias voltages required by different types of sensors (e.g., electrochemical sensors). A presently preferred embodiment of a voltage bias circuit in accordance with the present invention comprises an electrically programmable analog circuit (for example, an Electrically Programmable Analog Device) producing a plurality of intermediary voltages. The output of the programmable circuit acts as an input to a differential amplifier circuit. A sensor bias voltage ($V_{BIAS}$) is produced by the differential amplifier circuit such that the bias voltage is within a range specified by intermediary voltages provided by the programmable circuit. The bias voltage, $V_{BIAS}$, serves as an input to a sensor conditioning amplifier circuit. The sensor conditioning amplifier circuit stabilizes the input voltage bias and produces a conditioned bias voltage that accommodates the operational requirements of a given sensor.

According to one aspect of the invention, the programmable circuit comprises a pair of analog devices having first and second programmable threshold voltage levels. The configuration of the paired programmable analog devices are such that an increase in the value of the first preset programmed threshold voltage results in a decrease in the voltage bias level $V_{BIAS}$. Conversely, an increase in the second preset programmed threshold voltage level results in an increase of the voltage bias level.

In accordance with another aspect of the preferred embodiment, the programmed analog device threshold voltage levels can be repeatedly modified once they have been programmed onto the analog devices.

In accordance with another aspect of the presently preferred embodiment of the invention, the programmable analog device circuit is biased through a plurality of voltage divider networks from a reference voltage source. The reference voltage source acts as a pseudo-ground to the circuit and it provides a reference voltage for the voltage bias circuit.

In accordance with yet another aspect of the preferred embodiment, the differential amplifier circuit comprises an amplifier having a negative feedback configuration, producing a bias voltage within a range defined by the programmable circuit. The sensor conditioning amplifier circuit also comprises an amplifier having a negative feedback configuration, imparting a positive gain on the bias voltage, $V_{BIAS}$, so as to generate a stable bias voltage required by the sensor.

The foregoing and other aspects of the present invention will become apparent from the following detailed description of the invention when considered in conjunction with the accompanying drawings.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENT

The present invention provides an electrical circuit providing bias voltage to accommodate various types of sensors. Throughout the description, a presently preferred embodiment of the invention is described in connection with exemplary components. For example, in the presently preferred embodiment of the invention, reference is made to the use of an Electronic Programmable Analog Device (EPAD™). The referenced EPADs™, are exemplary programmable analog circuits. Accordingly, the invention should not be limited to a particular EPAD™, but rather may be practiced with other programmable analog circuits, as may be available and suitable for a particular application. (EPAD™ is a trademark of Advanced Linear Devices, Inc., Sunnyvale, Calif. The EPAD™ circuit comprises matched electronic programmable analog devices capable of accepting and maintaining a programmable threshold voltage level. For further information, see Application Note AN1108.)

Figure 1:
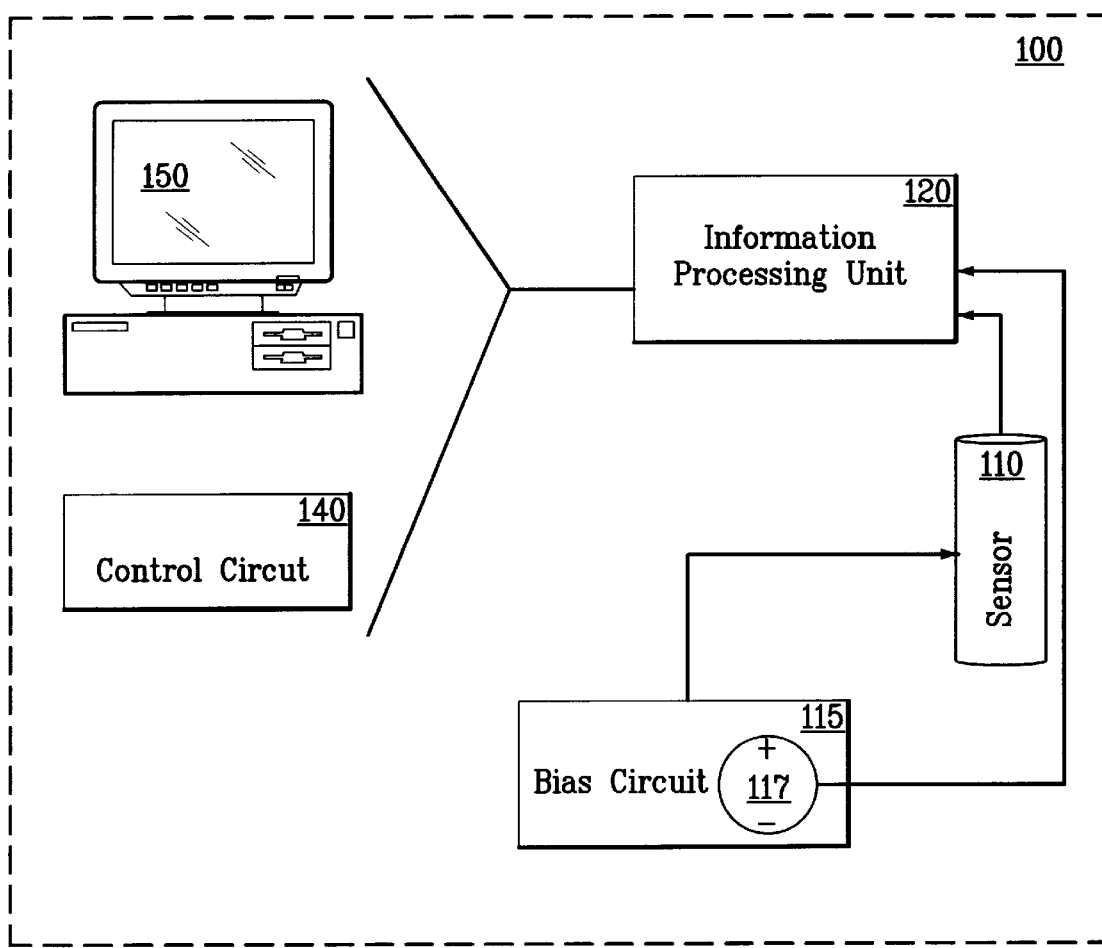
FIG. 1 is a system diagram of an information gathering circuit according to the present invention.

FIG. 1 shows an information gathering system 100 having sensor 110 electrically connected to bias circuit 115. Bias circuit 115 and reference voltage source 117 cooperate to provide an operating bias voltage to sensor 110. Additionally, FIG. 1 shows sensor 110 connected to information processing unit 120. Within information processing unit 120, values from reference voltage source 117 along with data collected by sensor 110 are processed to display information needed for human monitoring purposes on display unit 150, or to pass along to control circuit 140. Correspondingly, control circuit 140 may be used to automate the information gathering system 100 by communicating with information processing unit 120 to adjust or sample sensor 110.

Figure 2:
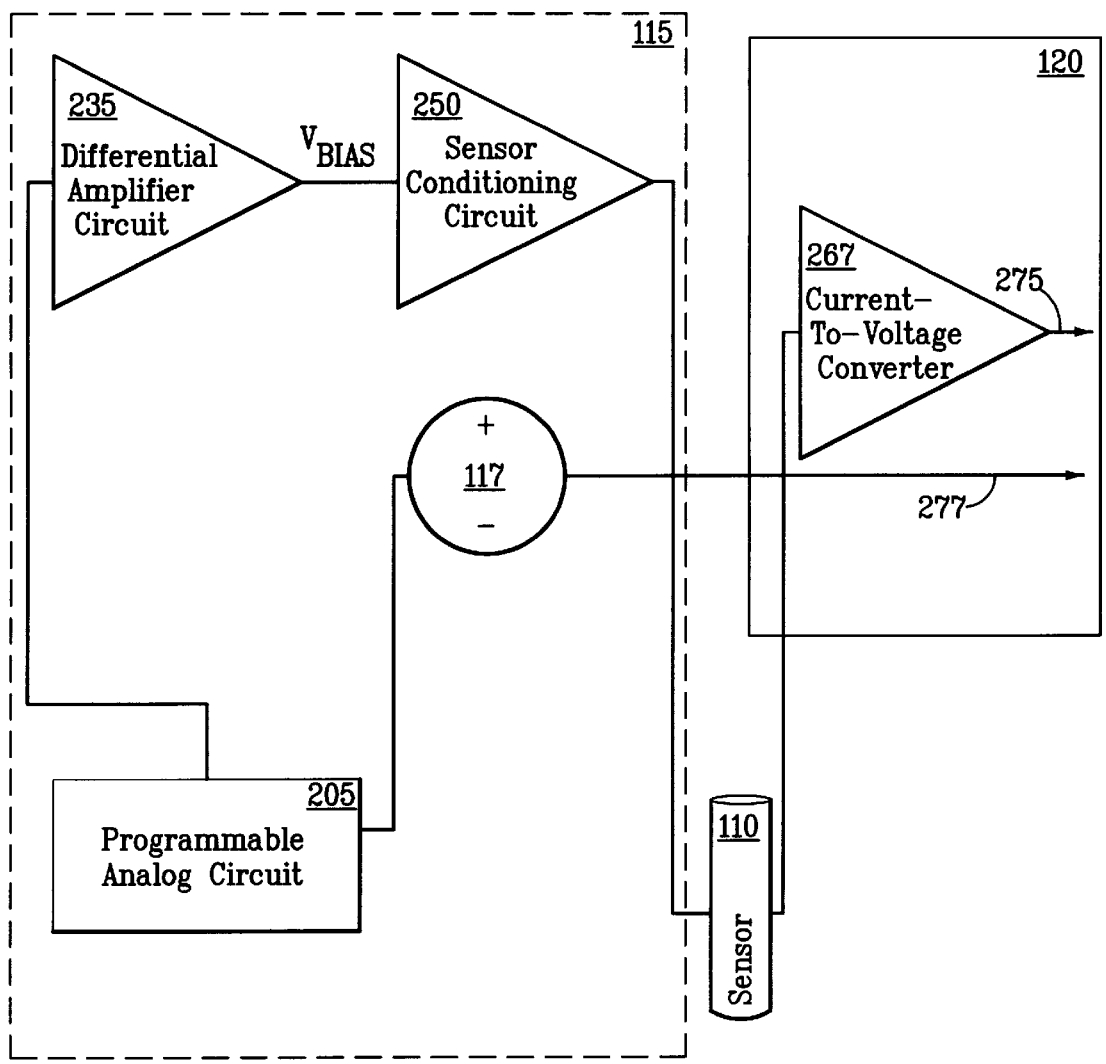
FIG. 2 is block diagram of an electrical biasing circuit of the present invention.
Figure 3:
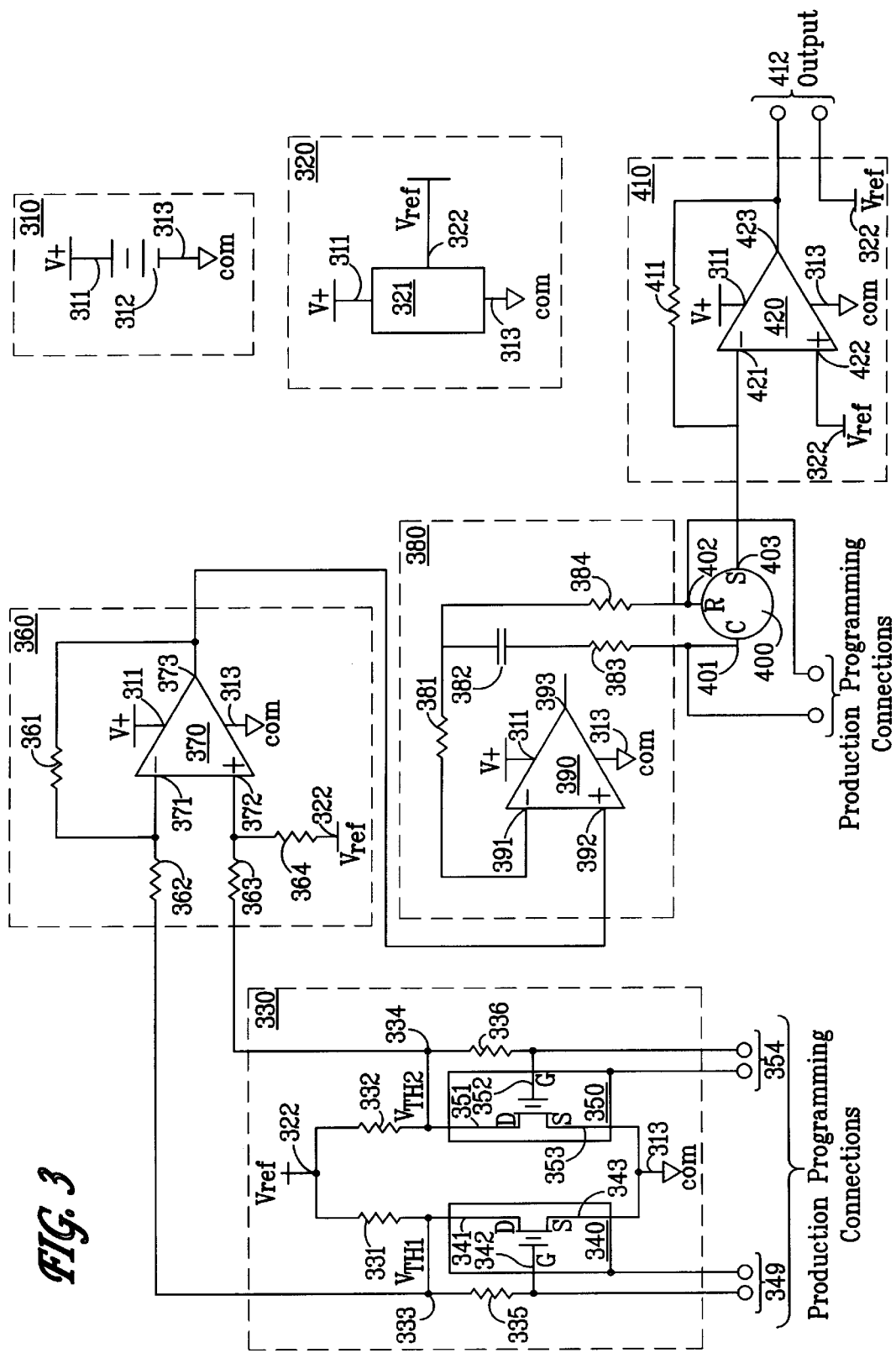
FIG. 3 is a detailed schematic diagram of the system of FIG. 2.

FIGS. 2 and 3 further illustrate the operation and implementation of the presently preferred embodiment of the invention. FIG. 2 shows bias circuit 115 having a programmable analog circuit 205. The programmable analog circuit 205 is electrically connected to the reference voltage source 117, such that the reference voltage source 117 provides bias to the programmable analog circuit 205. The output of the programmable analog circuit 205 is electrically connected to differential amplifier circuit 235. Differential amplifier circuit 235 accepts, as an input, an output of the programmable analog circuit 205, and produces a bias voltage, $V_{BIAS}$, as output. The output of differential amplifier circuit 235 acts as an input to sensor conditioning circuit 250, completing the voltage bias circuit 115. The sensor conditioning circuit 250 is electrically connected to sensor 110, such that sensor 110 receives the required operating bias voltage. Additionally, as shown in FIG. 2, the output of sensor 110 is connected to current-to-voltage converter amplifier 267. The current-to-voltage converter amplifier 267 converts the data received from the sensor 110 to a form accepted by the information processing unit 120. The information processing unit accepts the converted information from the current-to-voltage converter at point 275. As indicated, the information processing unit 120 utilizes values from reference voltage source 117 at point 277 in data processing.

FIG. 3 shows an electrical circuit for sensors requiring a variety of bias voltages comprising of power supply 310, reference voltage circuit 320, programmable analog circuit 330 having Electrically Programmable Analog Device (EPAD) 340 and 350 respectively, differential amplifier circuit 360, sensor bias buffer circuit 380, sensor 400 and current to voltage converter circuit 410.

Power Supply 310

Block 310 is the power supply for the electrical circuit. A source of voltage 312 may derive from a voltage regulator, batteries or other source of electrical voltage. Power supply positive (V+) 311 and power supply negative (common) 313 originate from this circuit.

Reference (Pseudo-Ground) 320

Block 320 shows a stable reference circuit 321. Reference voltage (Vref) 322 established between positive power supply voltage (V+) 311 and negative power supply (common) 313 originates from this circuit. The reference voltage 322 is also employed as a pseudo-ground for the circuit.

Programmable EPAD Pair 330

EPAD 340 has programming connections 344 and EPAD 350 has programming connections 354. To program these devices, a production programmer delivers pulse energy to EPAD 340 through connections 344. Similarly, EPAD, 350 is programmed during production by applying pulse energy through connections 354. Programming EPAD device 340 permanently increases the threshold voltage VTh1 333 of this device. Similarly, programming EPAD device 350 permanently increases the threshold voltage VTh2 334 of this device.

Resistor 331 is connected between reference voltage 322 and the drain 341 of EPAD 340. Resistor 335 is connected between the gate 342 and the drain 341 of EPAD 340. The source 343 of EPAD 340 is connected to circuit common 313. In this configuration, the drain 341 voltage is forced to the threshold voltage Vth1 of EPAD 340.

Similarly, resistor 332 is connected between reference voltage 322 and the drain 351 of EPAD 350. Resistor 336 is connected between the gate 352 and the drain of EPAD 350. The source 353 of EPAD 350 is connected to circuit common 313. This configuration forces the drain 351 voltage to the threshold voltage Vth2 of EPAD 350.

Differential Operational Amplifier 360

Block 360 shows operational amplifier 370 and resistors 361, 362, 363 and 364 to comprise a differential amplifier circuit.

Resistor 364 is connected between amplifier 370 non-inverting input 372 and Vref (pseudo-ground) 322. This connection establishes the reference voltage 322 as the reference voltage for the differential amplifier.

Resistor 361 provides negative feedback between amplifier 370 output 373 and amplifier 370 inverting input 371.

Resistor 363 is connected between amplifier 370 non-inverting input 372 and EPAD 350 drain 351, which is established at the threshold voltage Vth2 334 of EPAD 350 as explained above.

Similarly resistor 362 is connected between amplifier 370 inverting input 371 and EPAD 340 drain 341, which is established at the threshold voltage Vth1 333 of EPAD 340 as explained above.

In this configuration, differential operational amplifier 370 behaves to subtract the threshold voltage Vth1 333 of EPAD 340 from the threshold voltage Vth2 334 of EPAD 350. The difference is referenced to the pseudo-ground 322 (reference voltage) as explained above.

If the threshold voltage of EPAD 340 is increased through programming connections 344 and the threshold voltage of EPAD 350 is not changed, the output 373 of differential amplifier circuit 360 will decrease.

Similarly, if the threshold voltage of EPAD 350 is increased through programming connections 354 and the threshold voltage of EPAD 340 is not changed, the output differential amplifier circuit 360 will increase.

By selectively programming EPAD 340 and EPAD 350 with an external production programmer through programming connections 344 and 354, any voltage between circuit common 313 and the positive circuit supply voltage 311 can be obtained at the output 373 of differential amplifier circuit 360. Since output 373 of the differential amplifier 360 is referenced to the pseudo-ground (Vref) 322, the output of differential amplifier circuit 360 can be programmed to be higher, lower or the same as the pseudo-ground 322.

The output of differential amplifier circuit 360 is the programmable sensor bias voltage.

Sensor Bias Buffer Amplifier 380

Block 380 shows a buffer amplifier used to interface the programmable sensor bias voltage to sensor 400. The programmable bias voltage output 373 of differential amplifier circuit 360 is the input 392 to sensor buffer amplifier circuit 380.

The preferred embodiment shows an electrochemical sensor 400 driven in a three (3) electrode configuration with negative feedback between the buffer amplifier 390. In this configuration, the electrochemical sensor 400 counter electrode 401 is generally driven by the buffer amplifier 390 output 393 and negative feedback to the buffer amplifier 390 inverting input 391 is generally connected to the sensor 400 reference electrode 402.

Buffer circuit 380 components, such as resistors 381, 383 and 384 and capacitor 382, are filter elements sometimes included to reduce noise and instability and may have many values and be used in many combinations or omitted depending upon the particular sensor requirements.

Programming connections 385 are provided for production programming to monitor the output of buffer amplifier circuit 380. The application of these connections is explained below in the section entitled production programming of bias circuit.

Senor Output Amplifier 410

Block 410 shows an output amplifier 420 generally used to interface a sensor to an information processing system.

In the preferred embodiment, the sense electrode 403 of an amperometric electrochemical gas sensor 400 is connected to the inverting input 421 of current-to-voltage converter output amplifier 420. Negative feedback is provided by resistor 411 connected between amplifier 420 output 423 and amplifier 420 inverting input 421. The non-inverting input 422 of amplifier 420 is connected to the reference voltage (pseudo-ground) 322.

In this configuration, a sensor that sources current in the presence of gas will cause the output amplifier circuit 410 to have a negative excursion at the output 412. Similarly, a sensor that sinks current in the presence of gas will cause the output amplifier circuit 410 to have a positive excursion at the output 412.

Production Programming of Bias Circuit

One unique feature of this design is the ability to program the bias to any value while the circuit is under power. This capability constitutes a precise calibration and permits errors due to imperfections in the amplifiers or errors caused by component tolerances to be corrected while the circuit is being programmed.

The EPAD devices are programed through the use of an external production programmer to deliver pulse energy to EPAD 340 through production programming connections 344. Similarly, EPAD 350 is programmed by applying pulse energy through production programming connections 354. During programming, the output 393 of sensor bias buffer amplifier circuit 380 is monitored by the programmer at connection 385. The programmer selectively pulses the appropriate EPAD through production programming connections 344 and 354 to achieve the precise bias voltage desired.

The above description of preferred embodiments is not intended to impliedly limit the scope of protection of the following claims. Thus, for example, except where they are expressly so limited, the following claims are not limited to applications involving voltage bias circuits.

What is claimed is:

1. An electrical circuit for biasing an electrochemical sensor comprising:

an electrochemical sensor;

an electrically programmable analog device;

a differential amplifier circuit electrically connected to said electrically programmable analog device, wherein said differential amplifier circuit accepts as input an output of said electrically programmable analog device to produce a bias voltage; and a sensor conditioning amplifier circuit electrically connected to said electrochemical sensor, wherein the sensor conditioning amplifier circuit receives the output of said differential amplifier circuit.

2. The circuit recited in claim 1, further comprising a reference voltage source electrically connected and providing a current to said electrically programmable analog device.

3. The circuit recited in claim 2, wherein said sensor conditioning amplifier stabilizes the bias voltage and provides a stable bias voltage to said sensor.

4. The circuit recited in claim 3, wherein said electrically programmable analog device comprises a programmable pair of analog devices having first and second programmed threshold voltage levels.

5. The circuit recited in claim 4, wherein an increase in said first programmed threshold voltage level results in a decrease in said bias voltage, and an increase in said second programmed threshold voltage level results in an increase in said bias voltage.

6. The circuit recited in claim 4, wherein said electrically programmable analog device further comprises a plurality of resistors determining current to said electrically programmable analog device from said reference voltage source.

7. The circuit recited in claim 6, wherein said current determining resistors comprise at least one of the following: carbon film resistors and integrated circuit voltage dividers.

8. The circuit recited in claim 4, wherein said electrically programmable analog device voltage threshold levels can be modified repeatedly after they are set.

9. The circuit recited in claim 4, wherein said programmable pair analog devices comprise members of the group consisting of FETs, BJTs, IGBTs, and MCTs.

10. The circuit recited in claim 1, wherein said differential amplifier circuit comprises a gain amplifier having a negative feedback configuration producing said bias voltage in a range defined by said electrically programmable analog device.

11. The circuit recited in claim 1, wherein said sensor conditioning amplifier circuit, comprises a non-inverting gain amplifier having a negative feedback configuration.

12. The circuit recited in claim 1, wherein said electrically programmable analog device is an EPAD™.

13. An electrical circuit for biasing an electrochemical sensor comprising:

an electrochemical sensor;

a reference voltage source;

an electrically programmable analog device, electrically connected to and receiving current from said voltage source, having a plurality of transistors maintaining a plurality of voltage threshold levels and producing intermediary voltage levels in relation to said voltage threshold levels;

a differential amplifier circuit electrically connected to said electrically programmable analog device accepting as an input said intermediary voltage levels for producing a bias voltage, said differential amplifier circuit comprising a gain amplifier having a negative feedback configuration producing said bias voltage in a range defined by said intermediary voltage levels; and a sensor conditioning amplifier circuit electrically connected to said sensor, wherein said sensor conditioning amplifier circuit receives the output of said differential amplifier circuit to produce a stable bias voltage to said sensor, said sensor conditioning amplifier circuit comprising a non-inverting gain amplifier having a negative feedback configuration.

14. The circuit recited in claim 13, wherein said electrically programmable analog device comprises an EPAD™.

15. A method for biasing an electrochemical sensor comprising the steps of:

(a) programming an electrically programable analog device found on an electronic bias circuit to a desired voltage threshold level; and (b) attaching an electrochemical sensor to said electronic bias circuit.

16. The method for biasing a sensor recited in claim 15, wherein step (a) comprises:

programming an Electronically Programable Analog Device (EPAD) found on an electronic bias circuit to a desired voltage threshold level.

17. The method for biasing a sensor recited in claim 16, wherein the step of programming the EPAD comprises programming a voltage bias level to a desired value while the electronic bias circuit is under power.

18. The method for biasing a sensor recited in claim 15, comprising the use of an external production programmer to deliver pulse energy to said electrically programmable analog device through a programming connection associated with said electrically programmable analog device, and monitoring an output of an amplifier, wherein said electrically programmable analog device is pulsed through the production programming connection to achieve the desired bias voltage level.

19. An electrical circuit for biasing an electrochemical sensor comprising:

an electrochemical sensor;

a reference voltage source; and an electrically programmable analog device, electrically connected to and receiving current from said reference voltage source, wherein said electrically programmable analog device is characterized as having the ability to maintain a plurality of voltage threshold levels and producing an intermediary voltage level in relation to said voltage threshold levels to provide to said electrochemical sensor.

20. The electrical circuit for biasing an electrochemical sensor as recited in claim 19, further comprising:

a differential amplifier circuit electrically connected to said electrically programmable analog device accepting as input said intermediary voltage levels for producing a bias voltage; and a sensor conditioning amplifier circuit electrically connected to said sensor, wherein said sensor conditioning amplifier circuit receives the output of said differential amplifier circuit to produce a stable bias voltage to said electrochemical sensor.

21. The electrical circuit for biasing an electrochemical sensor as recited in claim 20, wherein said differential amplifier circuit comprises a gain amplifier having a negative feedback configuration producing said bias voltage in a range defined by said electrically programmable analog device's output intermediary voltage levels.

22. The electrical circuit for biasing an electrochemical sensor as recited in claim 20, wherein said sensor conditioning amplifier circuit comprises a non-inverting gain amplifier having a negative feedback configuration.

23. An electrical circuit for biasing a sensor comprising:

a reference voltage source; and an electrically programmable analog device, electrically connected to and receiving current from said voltage source through resistive elements, said electrically programmable analog device having the ability to maintain a plurality of voltage threshold levels and producing intermediary voltage levels in relation to said voltage threshold levels to provide to said electrochemical sensor;

a differential amplifier circuit electrically connected to said programmable analog device accepting as input said intermediary voltage levels for producing a bias voltage; and a sensor conditioning amplifier circuit electrically connected to said sensor, wherein said sensor conditioning amplifier circuit receives the output of said differential amplifier circuit to produce a stable bias voltage to said electrochemical sensor.

24. The electrical circuit for biasing an electrochemical sensor as recited in claim 23, wherein said differential amplifier circuit comprises a gain amplifier having a negative feedback configuration producing said bias voltage in a range defined by said intermediary voltage levels.

25. The electrical circuit for biasing an electrochemical sensor as recited in claim 23, wherein said sensor conditioning amplifier circuit comprises a non-inverting gain amplifier having a negative feedback configuration.

* * * * *

UNITED STATES PATENT AND TRADEMARK OFFICE
CERTIFICATE OF CORRECTION

PATENT NO. : 6,121,823
DATED : September 19, 2000
INVENTOR(S) : Stephen D. Summerfield It is certified that error appears in the above-indentified patent and that said Letters Patent is hereby corrected as shown below:

Column 5, line 38, delete "senor" and insert --sensor-- therefor.

Column 5, line 62, delete "programed" and insert --programmed-- therefor.

Column 7, line 29, delete "programable" and insert --programmable-- therefor.

Column 7, line 36, delete "programable" and insert --programmable-- therefor.

Signed and Sealed this

First Day of May, 2001

Attest:

NICHOLAS P. GODICI

Attesting Officer

Acting Director of the United States Patent and Trademark Office